Sept. 11, 1962  P. J. W. VAN DEN MUNCKHOF  3,053,327

MACHINES FOR HARVESTING POTATOES AND OTHER TUBERS

Filed Aug. 1, 1960

INVENTOR
PETER J. W. VAN DEN MUNCKHOF

By

United States Patent Office 3,053,327
Patented Sept. 11, 1962

3,053,327
MACHINES FOR HARVESTING POTATOES
AND OTHER TUBERS
Peter J. W. van den Munckhof, 12–16 Venrayscheweg,
Horst, Netherlands
Filed Aug. 1, 1960, Ser. No. 46,760
2 Claims. (Cl. 171—88)

The invention relates to a machine for harvesting potatoes and other tubers or bulbous plants, said machine being provided with two wheels rotating in opposite direction and arranged with a mutual spacing corresponding to the spacing of the plant rows, said wheels being provided with rod-like teeth and having their axes inclined forwards.

The invention has for its object to improve a machine of this kind in such a manner, that the wheels themselves are adapted to dig-up the potatoes out of the ground, so that no plough-share is required.

According to the invention the teeth of each wheel are arranged to form a conical surface having its bottom plane facing downwards, said wheels having their axes converging upwards in such a manner that the wheels themselves dig-up the potatoes out of the ground. With said arrangement each wheel takes up the potatoes from a row so that two rows are simultaneously harvested, whereby the capacity of the machine is more than doubled.

In order to prevent the potatoes from becoming damaged by the teeth of the wheels said teeth of both wheels preferably interdigitate with the teeth of the other wheels. Moreover the potatoes are now prevented from falling down between the wheels, as the wheels in certain respect are forming an elevating gutter and are adapted to transmit the potatoes to a conveyor.

The invention will be further described with reference to the accompanying drawing showing an embodiment of the machine according to the invention.

Figure 1:
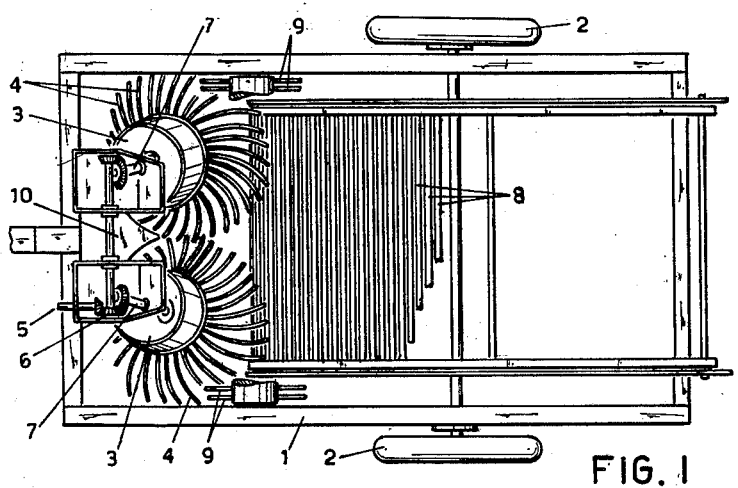
Figure 2:
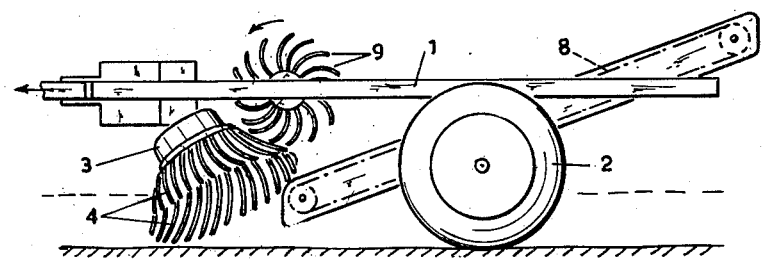

In the drawing FIG. 1 is a diagrammatic plan view of the machine and FIG. 2 is a side view thereof.

Figure 3:
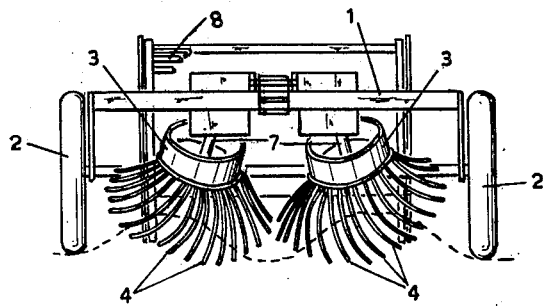

FIG. 3 shows a front view of the machine.

Two conical wheels 3 having their bottom plane facing downwards are supported in a frame 1 provided with running wheels 2. The rod-like teeth 4 of said wheels 3 are curved in such a manner that they constitute a concave conical surface. As appears from FIG. 3 the mutual spacing of the axes of the wheels 3 is so large that each wheel takes up the potatoes from a row.

The shafts 7 of the wheels 3 are inclined forwards and converge upwards, so that a gutter is formed between the wheels having their teeth 4 at the ends interdigitating to a small extent. Due to the converging axes of the wheels 3 the bottom planes of the wheels are inclined, so that it is prevented that the wheels come into contact with and disturb an adjacent row containing potatoes.

The shafts of the wheels 3 are driven from a shaft 5 in opposite directions through the intermediary of bevel gears 6, so that the potatoes are elevated in the space between the wheels, and transmitted to a gridlike conveyor 8 constituted by transverse bars and elevating the potatoes, but allowing the soil taken up together with the potatoes to fall down on the ground. A wheel 9 is mounted above each wheel 3 serving to remove stalks and roots from said wheels.

A plate 10 is mounted at the front of the machine between the wheels 3 for preventing potatoes from falling down between the wheels.

What I claim is:

1. A machine for harvesting potatoes and other tubers, or bulbous plants, comprising a frame in which two wheels are supported with a mutual spacing related to the spacing between a pair of plant rows, a drive for rotating said wheels in opposite directions, said wheels having their axes inclined forwardly and converging upwardly and being provided with rod-like teeth, the teeth of each wheel being free at their ends to interdigitate with the teeth of the other wheel, and said teeth of each wheel being shaped to form a conical surface with the bottom free ends of the teeth falling in a bottom plane facing downwardly and intersecting one of said pair of plant rows whereby upon rotation of the wheels said teeth are adapted to dig the tubers out of the ground simultaneously from a pair of spaced rows.

2. A machine according to claim 1 wherein said teeth of each wheel are bent to form a conical surface which is concave upwardly.

References Cited in the file of this patent
UNITED STATES PATENTS

| 430,330 | Ayres | June 17, 1890 |
| 1,776,485 | Bamford et al. | Sept. 23, 1930 |
| 2,842,215 | Morrison | July 8, 1958 |

FOREIGN PATENTS

| 207,723 | Germany | Mar. 9, 1909 |